(12) United States Patent
Nitzsche et al.

(10) Patent No.: US 8,448,185 B2
(45) Date of Patent: May 21, 2013

(54) METHOD AND SYSTEM FOR DYNAMIC DISCOVERY OF SERVICES IN A COMMUNICATION FRAMEWORK

(75) Inventors: Stefan Nitzsche, Frankenthal (DE); Hartmut Ludwig, West Windsor, NJ (US)

(73) Assignee: Siemens Aktiengesellschaft, Munich (DE)

( * ) Notice: Subject to any disclaimer, the term of this patent is extended or adjusted under 35 U.S.C. 154(b) by 1059 days.

(21) Appl. No.: 12/409,165

(22) Filed: Mar. 23, 2009

(65) Prior Publication Data

US 2010/0242053 A1    Sep. 23, 2010

(51) Int. Cl.
G06F 9/44      (2006.01)
G06F 15/173    (2006.01)

(52) U.S. Cl.
USPC .......................................... 719/317; 709/236

(58) Field of Classification Search
None
See application file for complete search history.

(56) References Cited

U.S. PATENT DOCUMENTS

| | | | |
|---|---|---|---|
| 2003/0004744 A1* | 1/2003 | Greene et al. ...................... | 705/1 |
| 2004/0236633 A1* | 11/2004 | Knauerhase et al. ........... | 705/26 |
| 2005/0044197 A1 | 2/2005 | Lai | |
| 2007/0033167 A1 | 2/2007 | Basu | |
| 2007/0195766 A1* | 8/2007 | Sukumar et al. .............. | 370/389 |
| 2008/0222210 A1 | 9/2008 | Hodges | |
| 2010/0174771 A1* | 7/2010 | Cobb ............................ | 709/201 |

FOREIGN PATENT DOCUMENTS
WO    WO 2007/113164 A1    10/2007

OTHER PUBLICATIONS

Luckow A et al: "Service replication in grids: ensuring consistency in a dynamic, failure-prone environment", 2008 IEEE International Parallel & Distributed Processing Symposium IEEE Piscataway, NJ, USA, 2008, pp. 1-7, XP002874891, ISBN: 978-1-4244-1693-6, the whole document.

Juszczyk L et al: "Web service discovery, replication, and synchronization in ad-hoc networks", Proceedings. The First International Conference on Availability, Reliability and Security IEEE Computer SOC. Los Alamitos, CA, USA 2006, p. 8 PP., XP002674890, ISBN: 0-7695-2567-9, the whole document.

Chenliang Sun et al: "Comparison of UDDI registry replication strategies", Web Services, 2004. Proceedings. IEEE International Conference on San Diego, CA, USA Jul. 6-9, 2004, Piscataway, NJ, USA, IEEE, Jul. 6, 2004, pp. 218-225, XP010709168, DIO: 10.1109/ICWS.2004.1314742 ISBN: 978-0-7695-2167-1, the whole document.

European Search Report in corresponding EP Application No. EP 10 15 6825, Apr. 27, 2012: Date of Completion.

* cited by examiner

*Primary Examiner* — Andy Ho
*Assistant Examiner* — Abdou Seye
(74) *Attorney, Agent, or Firm* — King & Spalding LLP

(57) ABSTRACT

A system for dynamic discovery of services comprises a communication framework module comprising a local service registry having service information. The local service registry is operable to be updated by the communication framework module when a message is received with updated service information relating to at least one additional communication framework module. The service information comprises a plurality of service interfaces.

20 Claims, 6 Drawing Sheets

METHOD AND SYSTEM FOR DYNAMIC DISCOVERY OF SERVICES IN A COMMUNICATION FRAMEWORK

FIELD OF THE INVENTION

The present invention relates to the field of dynamic service discovery in control systems. In particular, the present invention relates to providing dynamic and flexible service discovery using local registries in a communication framework architecture.

BACKGROUND OF THE INVENTION

A service-oriented architecture (SOA) is a software architecture where functionality is grouped around processes and packaged as interoperable services. The aim of a SOA is to reduce the coupling of services with operating systems, programming languages, and other technologies that underlie applications. A SOA separates functions into distinct units, or services, which are made accessible over a network. These services communicate with each other by passing data from one service to another, or by coordinating an activity between two or more services.

In a SOA, it is important to know which services are available at a given time. Conventional solutions for service availability use a static approach. For example, in Microsoft Windows, an appropriate service can be chosen out from a static registry entry in the operating system registry (based on a static GUID) or based on dynamic monikers that depends on static GUIDs.

Today, the static registration of services and interfaces is done during installation. Distributed applications are difficult to maintain due to network security issues. For example, DCOM security settings may change in every service pack or may vary from operating systems to operating system (e.g., from Microsoft Windows XP to Vista).

SUMMARY OF THE INVENTION

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

A communication framework architecture can include a service discovery system with a decentralized dynamic service registry. The communication framework includes integrated service interface status information, management of registration properties, management of service interfaces and allows seamless integration of systems and a service oriented architecture. The framework facilitates consistency and availability of service endpoint information across different network nodes and reduces complexity for service deployment by reducing the cost of setup and software updates and decreases response times due to the decentralized approach.

A service discovery system can maintain dynamic local registries of service providers within a SOA. The service providers register with local registries when they come online, and the local service registries notify other service registries of services provided via a multicast signal. The registries maintain up-to-date information on other registries using a cyclic life-beat communication, with unresponsive registries being removed.

The service discovery can be dynamic and independent from any kind of static configuration at installation or at deployment time. In addition, the dynamic approach with immediate online updates of changes across systems makes the runtime systems more flexible and allows fast reactions according to changes at runtime, e.g., starting, stopping or modifying services.

The service discovery system can manage service interfaces instead of objects or services in service registries, making it easier to follow the SOA approach and ensure a higher optimized data throughput in cross service operations due to multiple highly optimized role specific service interfaces for single services.

Adding and modifying service attributes, such as status or additional properties, online in the service registry can give runtime services the ability to find and check service availability with a single call to the service registry.

Clients may subscribe to a service registry with a filter to certain criteria and wait on registration of new service interfaces. Subscriptions may also filter on certain registration criteria or modifications on service interface data or its attributes based on various criteria. This allows development of smart services or applications that can handle deployment changes, e.g., moving a service from one computer to another, would not require static service interface registration during deployment or waiting on a dedicated service without polling.

The scope of service registry could be changed or enhanced dynamically by customer demand from one to multiple systems and allows a seamless integration of systems. In redundant systems multiple entries (one entry for each redundant node) could be managed by the service registry. This increases reliability and availability of the service and the rest of the runtime infrastructure. The decentralized service registry acts as a single point of service information for the whole system improves consistency of data and increases performance. The management of role specification interfaces instead of simple object registration or the registration of a single interface per service has the advantages of lower resource consumption, higher flexibility, and increased security due to smaller and more user role specific interfaces.

In one embodiment, a system for dynamic discovery of services comprises a communication framework module comprising a local service registry, the local service registry comprising service information. The local service registry is operable to be updated by the communication framework module when a message is received with updated service information relating to at least one additional communication framework module. The service information comprises a plurality of service interfaces.

In another embodiment, a method for dynamic discovery of services comprises providing a local communication framework including a local service registry; coming online by the service provider; registering service information from the service provider with the local service registry; broadcasting, from the communication framework, information in the local service registry; receiving a broadcast from a remote communication framework; and updating the local service registry in response to the broadcast.

In yet another embodiment, a computer-readable storage medium storing program code for causing a server to perform providing a local communication framework including a local service registry; coming online by the service provider; registering service information from the service provider with the local service registry; broadcasting, from the communication framework, information in the local service registry; receiving a broadcast from a remote communication framework; and updating the local service registry in response to the broadcast.

BRIEF DESCRIPTION OF THE DRAWINGS

Embodiments of the inventions are illustrated in the figures. However, the embodiments and figures are illustrative rather than limiting; they provide examples of the invention.

DETAILED DESCRIPTION OF THE EXEMPLARY EMBODIMENTS

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
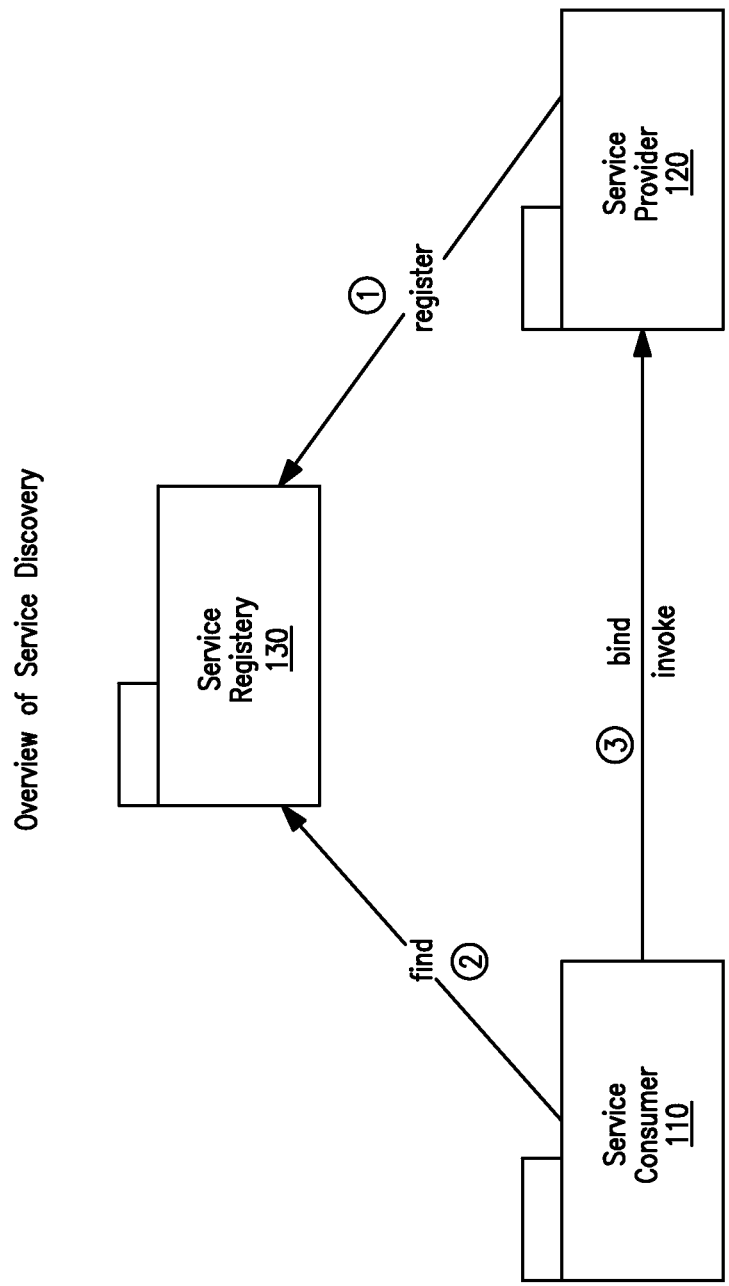
FIG. 1 depicts a block diagram of an exemplary embodiment illustrating dynamic discovery of services in a service-oriented architecture.

FIG. 1 depicts a block diagram illustrating dynamic discovery of services in a Service-Oriented Architecture 100. FIG. 1 includes a Service Consumer 110, a Service Provider 120 and a Service Registry 130. The Service Provider 120 registers with the Service Registry 130. The Service Consumer 110 can use the Service Registry 130 to find services that are available.

The Service Provider 120 registers with the Service Registry 130 when the Service Provider 120 comes online. In an exemplary embodiment, the Service Provider 120 stores a service interface in the Service Registry 130. The service interface provides the parameters required to invoke the service offered by Service Provider 120. The Service Consumer 110 connects to the Service Registry 130 to search and discover services currently available through service providers.

The Service Consumer 110 can search and find services in the Service Registry 130. The Service Consumer 110 can invoke services found in the registry by first performing a bind operation on the Service Provider 120. The bind operation establishes a connection between the Service Consumer 110 and the Service Provider 120. The bind operation may include establishing the physical pathway used for communication between the Service Consumer 110 and the Service Provider 120. The bind operation may also include assigning a network address and protocol to a particular network port.

After the Service Consumer 110 is bound to the Service Provider 120, the Service Consumer 110 can invoke a service method of the Service Provider 120. In an exemplary embodiment, service consumers and service providers may operate as consumers and/or providers of services depending on the circumstances. For example, a service provider may act as a service consumer to other service providers.

In an exemplary embodiment, a service is a logical frame around a set of components that are exposing service interfaces. A service exposes at least one service interface but may also invoke other services. A service invokes components which are associated with program code—DLLs, executables, etc. The logical frame the services provide defines which components are executed, the order of their execution, and the components' interdependencies.

Figure 2:
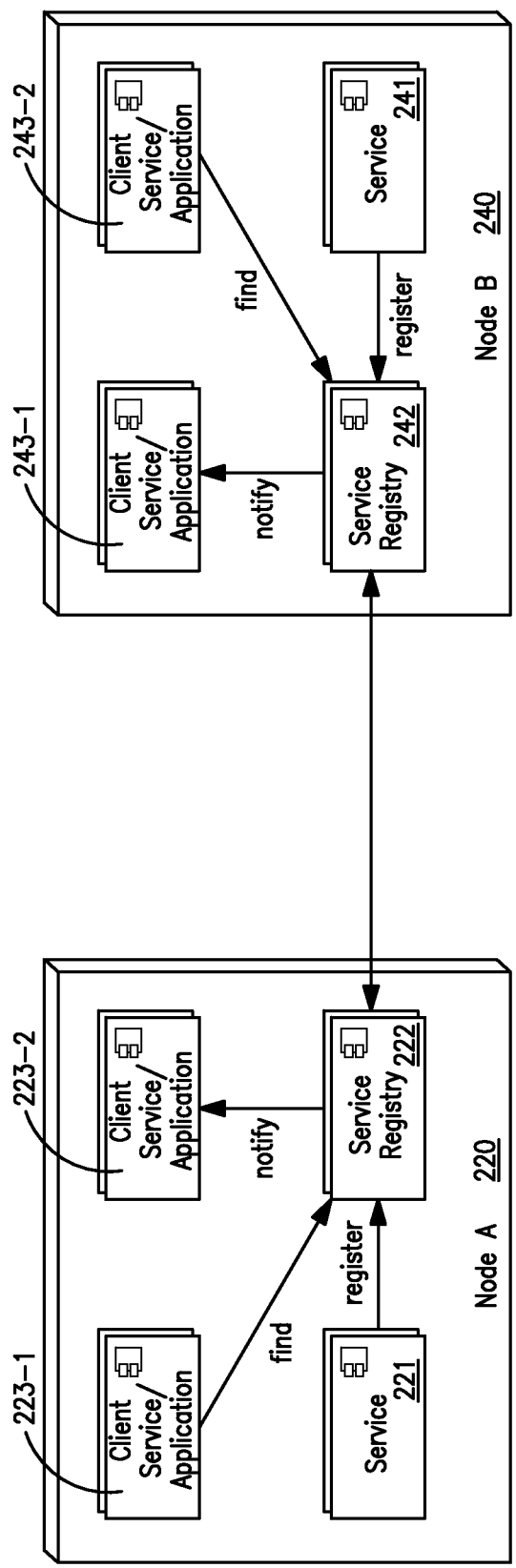
FIG. 2 depicts a block diagram of an exemplary embodiment of a dynamic service registry in a service oriented architecture.

FIG. 2 depicts a block diagram of a dynamic service registry in a service oriented architecture. FIG. 2 includes a Node A 220 and a Node B 240. The Node A 220 comprises a Service 221, a Service Registry 222, a first Client Service/Application 223-1 and a Second Client/Service Application 223-2. The Node B comprises a Service 241, a Service Registry 242, a first Client Service/Application 243-1 and a Second Client/Service Application 243-2.

The Service 221 is an application and/or program that provides a service through a service interface. For example, a service may be a monitor and control service or an alarm service. When the Service 221 comes online, it registers its service interface(s) and capabilities into the Service Registry 222. Service interfaces are programmatic interface specifications describing services. Example service interfaces are an Data Access Interface or an Alarm Interface.

The Data Access ("DA") Interface is an interface to a service which that provides access to process values. A process value object is any property of a managed object. At runtime each process value object is represented by a process value, which consists of value, timestamp and quality code. A process value can be an internal state, an internally calculated value or a value obtained from an external entity. A process value object may be addressed by a Runtime Object ID. The DA Interface may be designed to be supported by different services, for example, monitoring services and control services, and are independent from the service(s) implementing the DA Interface.

The Alarm Interface may provide a standard an unified service interface for accessing alarms and alarm data. The Alarm Service may provide a layer of abstraction between Alarm Sources and Alarm Clients, receiving alarms from a set of Alarm Sources, and presenting a unified, standardized, and cohesive alarm management interface towards Alarm Clients, thereby hiding irrelevant Alarm Source aspects, unifying differences, and supplementing missing Alarm Source capabilities The Service Registry 222 is a list of service endpoint information. For example, the Service Registry 222 may include IP addresses, Ports, Context IDs, Service IDs, Service Instance Names, Service Interfaces Name, etc. The Service Registry 222 may include services both locally on the Node A 220 and those which are contained on foreign nodes, such as the Node B 240. The Service Registry 222 is local to the Service 221 because it is contained within the same Node A 220. The Service Registry 222 is a dynamic and is operating system independent. The Service Registry 222 is dynamic because it is bound to the lifetime of the Node A 220 and is populated completely at runtime. The Service Registry 222 has no persistency and no storage which holds endpoint information over the life time of a service or service interface. In an exemplary embodiment, there is no pre-configuration of the Service Registry 222 and there is no host list maintained by a central server.

In an exemplary embodiment, the Service Registry 222 may also comprise service information from remote service registries by default. The Service Registry 222 is remote if it is in a different node, and may or may not relate to physical distance. The Service Registry 222 is kept up-to-date with service information from the remote service registries.

Different mechanisms, alone or in combination, may be used to keep the Service Registry 222 up-to-date. In an exemplary embodiment, the Node A 220 includes a multicast mechanism that asynchronously sends out changes to the local Service Registry 222. Multicast is a network addressing method for the delivery of information to a group of destinations simultaneously. In an exemplary embodiment, the multicast mechanism will include determining the most efficient strategy to deliver the messages over each link of the network only once, creating copies only when the links to the multiple destinations split (typically network switches and routers).

In other exemplary embodiments, the Node A 220 may also include a cyclic life check sent to each of the remote service registries to ensure up-to-date information across service registries. In the cyclic life check, the Service Registry 222 sends a life check message to a remote registry. If the remote registry is found unresponsive to the life check, then the services in the remote registry are deleted from the Service Registry 222. Nodes may also include a mechanism that checks the origin source of each change notification of remote service registries, allowing the Service Registry 222 to ignore unnecessary change notifications and duplicate entries in a service endpoint table.

The Client Service/Applications 223-1 and 223-2 are consumers of services. Examples of consumers of services are Graphic User Interfaces ("GUI"), e.g., a Trend View on a DA interface or an Alarm View on an Alarm interface. The Client Service/Applications 223-1 and 223-2 are able to search for available local and remote services in the Service Registry 222 and make requests to these services.

In an exemplary embodiment, the Client Service/Applications 223-1 and 223-2 use the Service Registry 222 to identify services and to find services which match certain criteria. If the Client Service/Application 223-1 requires the use of a particular service it can search for the service in the Service Registry 222. If a service with matching service criteria is found by a service consumer, it can bind to the service and invoke its methods. Examples of possible service criteria are: the service URL, such as endpoint information including port, IP address, service name, etc.; service specific registration properties; service status information; or any mix of the above criteria. In an exemplary embodiment, a service consumer can use Service Registry 222 at any time (e.g., at system startup or during runtime on consumer service needs).

In an exemplary embodiment, the Service Registry 222 provides a notification interface for client service/applications, or a more general consumer, which could also be a service. For example, a consumer may wait for startup/shutdown of a dedicated service. If a consumer of a service interface is available before the provider, then the client service/application can subscribe with certain filter criteria to Service Registry 222 and be notified if a matching service interface becomes available. In such a situation, the consumer subscribes to the Service Registry 222 with a filter to the provider instances or the service interface and waits until the provider is available. The consumer is notified by the Service Registry 222 after the provider is registered. For example, a GUI, such as one which provides historical and trend data on a DA Interface on a client node may be already started while the server with the monitor and control service is down. The GUI can subscribe to Service Registry 222 with a filter to the monitor and control service and to the DA Interface. The GUI will be notified if the monitor and control service registers its DA Interface at the Service Registry 222.

In an exemplary embodiment, services may provide some self-contained functionality. Example services are a monitoring services, control services, alarm services, configuration services and activation services. A service may be a service consumer that uses functionalities of other services or it can be a plain service provider or both a service consumer and service provider. The services may be loosely coupled and communicate through well-defined interfaces. The dynamic registration of services in the Service Registry 222 and Service Registry 242 and the discovery of registered services support loose coupling of services to service consumers. Service Providers register a service interface at a Service Registry as when they are available. A Service Consumers may query the Service Registry for registered Services or subscribe for notification when a new Service registers. Communications between services may be based upon asynchronous, message-based communication.

A system, such as a industrial control system, may be composed of loosely coupled services. The services implement different types of business functionality according to the services role (Role-Specific Interfaces). The functionality of the services are exposed through an explicit service interface. Each interface may define a contract between a service provider and a service consumer.

Service interfaces are implementation agnostic. In other words, Service interfaces are defined with no dependency or reliance on its implementation or programming language. Components implement the internal functionality of a Service. They are derived from further decomposition of the Service functionality. Components represent pieces of fine-grained software functionality.

Figure 3:
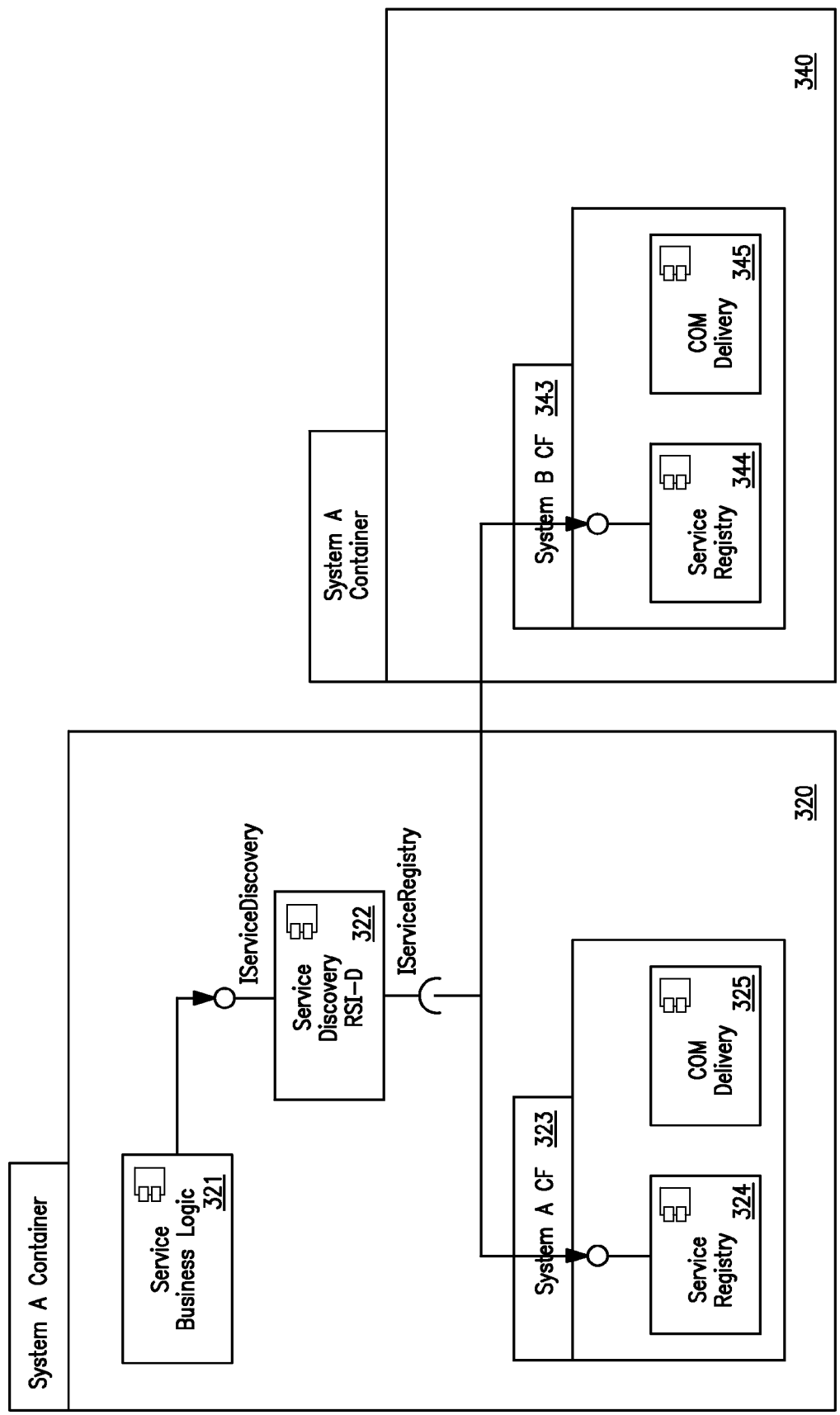
FIG. 3 depicts a block diagram of an exemplary embodiment of multiple service registries running on a computer node.

FIG. 3 depicts a block diagram of an exemplary embodiment with multiple service registries in multiple systems. FIG. 3 includes a Service Container 320 and a Service Container 340. Each of the Service Containers 320 and 340 run on a separate system. In an exemplary embodiment, a system is a separate product system for providing a service. The Service Container 320 includes Service Business Logic 321, the Service Discovery RSI-D 322, the System A CF 323, the Service Registry 324 and the COM Delivery 325. The Service Container 340 includes the System B CF 343, the Service Registry 344, and the COM Delivery 345.

The Service Business Logic 321 is a service consumer. The Service Business Logic 321 can discover Service Endpoint Information from multiple systems via Service Discovery RSI-D from the Service Registries of the multiple systems. The Service Business Logic 321 invokes different services found through their service interface. In an exemplary embodiment, the Service Business Logic 321 is an application domain specific function and is specific to a particular task or target market.

The Service Discovery RSI-D 322 provides a service to the Service Business Logic 321 which allows the Service Business Logic 321 to discovery services which are available, both in the local Service Container of System A 320 and the remote Service Container of System B 340. The services available may be in the Service Container of System A 320 or the Service Container of System B 340. The discovery of the services available across two or more systems is handled by the Service Discovery RSI-D 322 and may be seamless and transparent to the Service Business Logic 321.

The System A CF 323 is the communication framework application running on a system.

The Service Registry 324 runs as a local service on each computer node of the system. If more than one system is available on a single computer node, the computer node has one Service Registry per installed system. Service Registry 324 and the System 320 are linked together by a System ID, a unique identifier which is assigned to each System.

In case of a redundant system multiple entries for each service, one from service at Master node and one from service at Standby node, are contained in Service Registry, service endpoint table. In an exemplary embodiment, "hot" standby is used as a failover mechanism to provide reliability in system configurations. In this exemplary embodiment, at least two computer node that have the same configuration establish the hot standby mechanism, but only one node is active while the others a passive. The active node is called Master Node, the passive nodes are called Standby Nodes. The Service Registry 324 manages the service endpoint table, which may comprise a collection of local and remote service endpoint information that includes IP addresses, ports, context ids, service ids, service instance names, service interfaces, etc. Based on additional status information a client application is able to check if a dedicated service is running, and can decide to connect to a service interface on the Master or on Standby side. In case of cross system (intersystem) communication the Service Registry merges the service endpoint information. The Service Registry 324 manages the service endpoint table, which may comprise a collection of local and remote service endpoint information, including IP addresses, ports, context ids, service ids, service instance names, service interfaces, etc.

Figure 4:
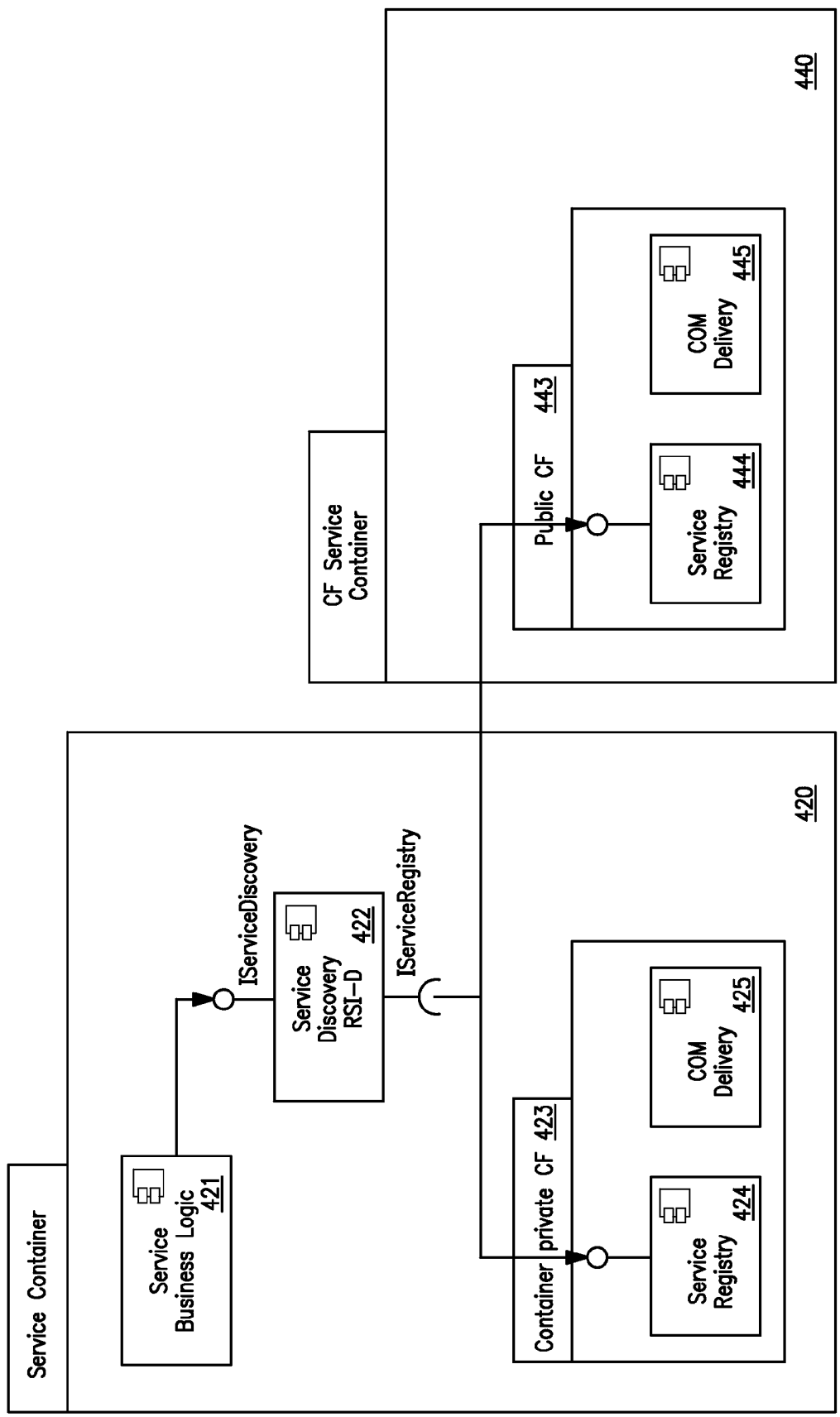
FIG. 4 depicts a block diagram of an exemplary embodiment of multiple service registries running on a computer node.

FIG. 4 depicts a block diagram of an exemplary embodiment with multiple service registries running on a computer node. FIG. 4 comprises Service Container 420 and CF Service Container 440. Service Container 420 comprises Service Business Logic 421, Service Discovery RSI-D 422, Container Private CF 423, Service Registry 424, and COM Delivery 425. Service Container 440 comprises Public CF 443, Service Registry 444, and COM Delivery 445.

The Public CF 443 includes Service Registry 444 and COM Delivery 445. The Public CF 443 includes service interfaces in the Service Registry 444 to services which can be used by any services and are therefore public services.

The Container Private CF 423 includes Service Registry 424 and COM Delivery 425. The Container Private CF 423 includes service interfaces in the Service Registry 424 to services which can only be used by services within the Service Container 420, and are therefore services private to the container. The private services and public services are accessed in the same manner and do not require the service to use a different mechanism.

Figure 5:
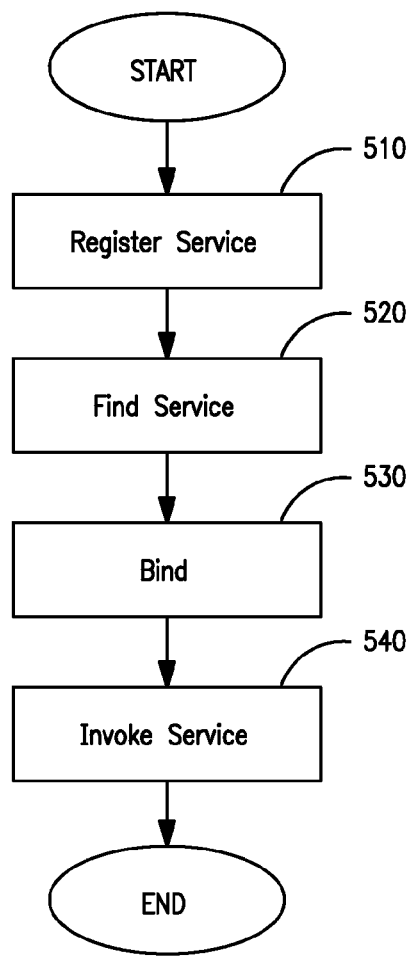
FIG. 5 depicts a flowchart diagram of a request for a service according to an exemplary embodiment.

FIG. 5 depicts a flowchart diagram of an exemplary embodiment of a request for a service. In block 510, a service provider registers one or more services it provides in a service registry. In block 520, a service consumer finds a service in a service registry. The service registry includes the address of the service provider providing the service, or some other information allowing the service consumer to invoke the service. In block 530, a service consumer binds with a service provider. In block 540, the service consumer invokes a service of the service provider.

Figure 6:
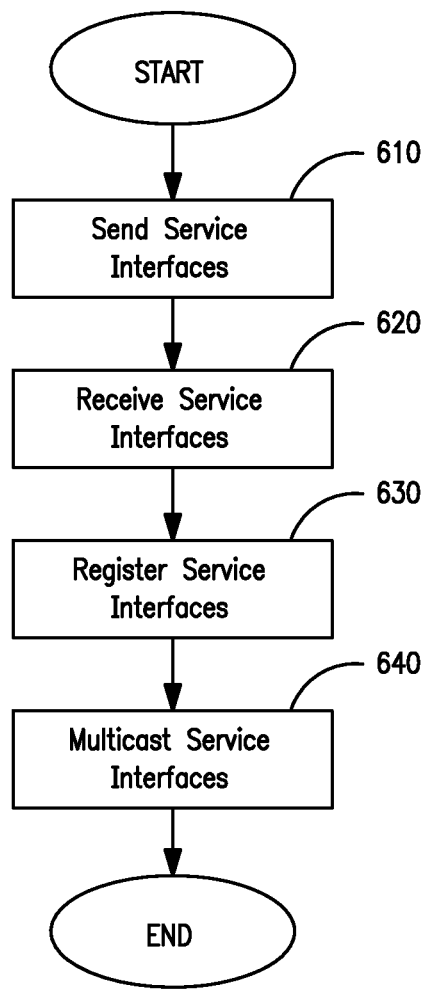
FIG. 6 depicts a flowchart diagram of an update to a local registry according to an exemplary embodiment.

FIG. 6 depicts a flowchart diagram of an exemplary embodiment of an update to a local registry. In block 610, a service provider sends the services interfaces of the one or more services offered by the service provider to a service registry. In an exemplary embodiment, the service providers send additional information such as the service provider address. In block 620, the service registry receives the service interface information. In block 630, the service interfaces are registered in the service registry. In block 640, a multicast message is sent which notifies nodes of the updated services offered.

The embodiments described above are intended to be exemplary. One skilled in the art recognizes that numerous alternative components and embodiments that may be substituted for the particular examples described herein and still fall within the scope of the invention.

What is claimed:

1. A system for dynamic discovery of services comprising:
a communication framework module of a computer node comprising a local service registry, the local service registry adapted to comprise service information associated with a local service of the computer node and a remote service of another computer node that is not local to the local service registry,
wherein a lifetime of the local service registry is bound to a lifetime of the computer node,
wherein a lifetime of the service information associated with the local service is bound to a lifetime of at least one of the local service and one or more parameters associated with invoking the local service,
wherein the lifetime of the service information associated with the remote service is bound to a lifetime of at least one of the remote service and one or more parameters associated with invoking the remote service,
wherein the local service registry is operable to be updated by the communication, framework module using a processor of the computer node when a message is received with updated service information relating to at least one additional communication framework module; and the service information comprises a plurality of service interfaces,
wherein the communication framework module is operable to send a cyclic life check message to a remote service registry that is not local to the computer node to update the local service registry with service information from the remote service registry based on a response of the remote service registry, and
wherein the communication framework module is operable to delete the services associated with the remote service registry from the local service registry if any, when the remote service registry is unresponsive to the cyclic life check message from the communication framework module.

2. The system of claim 1, wherein the communication framework module is operable to send a broadcast message comprising service information in the local service registry to another local service registry of the other computer node responsive to a service provider registering the service information with the local service registry.

3. The system of claim wherein the communication framework module is operable to send to multicast message with updated service information.

4. The system of claim 1, wherein the plurality of service interfaces correspond to a plurality of services available from a plurality of service providers.

5. The system of claim 4, wherein at least one service provider is local to the communication framework module and at least one service provider is remote to the communication framework module.

6. The system of claim 4, wherein at least one of the plurality of services relates to the control of an industrial process.

7. The system of claim 4, wherein at least one of the plurality of services relates to an alarm for an industrial process.

8. The system of claim 1, wherein the service interfaces are predefined service usage definitions.

9. A method for dynamic discovery of services comprising:
providing a communication framework that is local to a computer node and comprising a local service registry adapted to comprise service information associated with a local service of the computer node and a remote service of another computer node that is not local to the local service registry,
wherein the communication framework module is operable to send a cyclic life check message to a remote service registry that is not local to the computer node to update the local service registry with service information from the remote service registry based on a response of the remote service registry, and
wherein the communication framework module is operable to delete the services associated with the remote service registry from the local service registry if any, when the remote service registry is unresponsive to the cyclic life check message from the communication framework module;
coming online by a service provider;
registering service information from the service provider with the local service registry;
broadcasting, responsive to the service provider registering the service information with the local service registry, from the communication framework, the service information in the local, service registry to another local service registry of the other computer node that is not local to the local service registry;
receiving a broadcast from a remote communication framework; and
updating the local service registry in response to the broadcast.

10. The method of claim 9, wherein the broadcasting by the communication framework of the service information in the local service registry is performed using a multicast message.

11. The method of claim 9, wherein the service information comprises information pertaining to one or more service interfaces.

12. The method of claim 11, wherein the service interfaces are predefined service usage definitions.

13. The method of claim 11, wherein the broadcast from a remote communication framework comprises service information from a remote service provider.

14. The method of claim 13, further comprising:
invoking a service interface in the local service registry.

15. A non-transitory computer-readable storage medium storing program code for causing a server to perform:
providing a communication framework that is local to a computer node and comprising a local service registry adapted to comprise service information associated with a local service of the computer node and a remote service of another computer node that, is not local to the local service registry,
wherein the communication framework module is operable to send a cyclic life check message to a remote service registry that is not local to the computer node to update the local service registry with service information from the remote service registry based on a response of the remote service registry, and
wherein the communication framework module is operable to delete the services associated with the remote service registry from the local service registry if any, when the remote service registry is unresponsive to the cyclic life check message from the communication framework module;
coming online by a service provider;
registering service information from the service provider with the local service registry;
broadcasting, responsive to the service provider registering the service information with the local service registry, from the communication framework, the service information in the local service registry to a remote service registry of the other computer node that is not local to the local service registry;
receiving, a broadcast from a remote communication framework; and
updating the local service registry in response to the broadcast.

16. The computer-readable storage medium of claim 15, wherein broadcasting by the communication framework, service information in the local service registry is performed using a multicast message.

17. The computer-readable storage medium of claim 15, wherein the service information comprises information pertaining to one or more service interfaces.

18. The computer-readable storage medium of claim 17, wherein the service interfaces are predefined service usage definitions.

19. The computer-readable storage medium of claim 15, wherein the broadcast from a remote communication framework comprises service information from a remote service provider.

20. The computer-readable storage medium of claim 15, further comprising:
invoking a service interface in the local service registry.

* * * * *